United States Patent Office

3,267,075
Patented August 16, 1966

3,267,075
PROCESS FOR PRODUCING POLYCARBONATES
Hermann Schnell, Krefeld-Urdingen, and Ludwig Bottenbruch, Hans Georg Lotter, and Helmut Schwarz, Krefeld-Bockum, Germany, assignors to Farbenfabriken Bayer Aktiengesellschaft, Leverkusen, Germany, a corporation of Germany
No Drawing. Filed Dec. 20, 1962, Ser. No. 246,005
15 Claims. (Cl. 260—47)

This invention relates to polycarbonate compositions and more specifically to a new and improved method for producing polycarbonates.

The production of polycarbonate materials is well known in the prior art. For example, various processes are disclosed in U.S. Patents 3,028,365; 3,043,800 and 3,043,802 and in Canadian Patents 578,795; 594,805 and 611,970. One of the most successful of these processes, commercially speaking, is the phosgenation of 2,2-(4,4'-dihydroxy diphenyl)-propane in the presence of methylene chloride as a solvent as in the manner defined in above U.S. Patent 3,028,365. The crude product obtained usually is a polycarbonate solution containing from about 2 to about 30 to 40% polycarbonate and the remainder solvent and impurities.

There have been various methods suggested for removing this and other solvents used in the production of the polycarbonates from the solution, one being the volatilization of solvent by the use of an extruder. One type of extrusion means presently used comprises a compartmented barrel or housing having thereon degassing pipes extending from the internal portion of the housing to the atmosphere. As the crude polycarbonate solution passes through the extruder, it is heated above the boiling point of the solvent used, thus allowing the volatile solvent to escape from the extruder through the degassing pipes.

In the production of the polycarbonate solutions, various volatile contaminants, chlorinated impurities and other by-products are introduced into the final solutions because of the use of chlorine-containing reactants or reaction process components such as phosgene, or solvents, such as methylene chloride, ethylene dichloride and the like. The major portion of these volatile contaminants are somewhat easily removed, however, removal of residual portions remaining has presented a problem. Especially chlorinated impurities, e.g. residual amounts of chlorine containing solvents used in the production of the polycarbonates if allowed to remain in the polycarbonate solution will hinder further processing of the polycarbonate product thus formed. Also these contaminants cause clogging and corrosion of the equipment used and invariably cause a resulting polycarbonate product of inferior quality. The effective and substantially complete removal of residual volatile impurities is in many cases only possible with considerable technical expenditures and effort. This is especially true in extrusion type systems where very long degassing pipes and other expensive equipment have been required to provide somewhat satisfactory purification. Even with these extra provisions, some residual amounts of said impurities remain causing product deterioration and equipment corrosion. The removal of these residual amounts of impurities by various known methods including extruding is very difficult and complex.

It is therefore, an object of this invention to provide a process for the removal of difficultly volatilizable impurities from crude polycarbonate solutions. A further object of this invention is to provide an effective method for the removal of residual amounts of chlorine-containing impurities from crude polycarbonate products. Another object of this invention is to provide an improved extrusion process for the recovery of substantially pure polycarbonate materials from a crude polycarbonate solution. Still another object of this invention is to provide a process for removing residual chlorine contamination from polycarbonate mixes wherein presently available equipment and known procedures may be used. Still a further object of this invention is to provide a convenient economical method of removing residual amounts of solvents and other volatile impurities from polycarbonate solutions or melts before extrusion of the final polycarbonate product.

Generally speaking, the foregoing objects and others are accomplished in accordance with this invention by providing a process for the production of polycarbonate materials substantially free of difficultly volatilizable contaminants which comprises mixing with a polycarbonate solution or melt a chemically inert material having a boiling point below the decomposition temperature of the polycarbonate, heating the resulting mix to at least the boiling point of said inert materials to volatilize remaining solvent and impurities therefrom, and thereafter extruding the substantially pure polycarbonate. In addition a special embodiment of the present invention is a process for the production of polycarbonate materials substantially free of chlorine-containing contaminants which comprises mixing a chlorine-containing polycarbonate solution or melt and a chemically inert material having a boiling point below the decomposition temperature of the polycarbonate, heating the resulting mix to at least the boiling point of said inert material to volatilize remaining solvent and impurities therefrom, and thereafter extruding the substantially chlorine-free, pure polycarbonate. In these processes, the inert materials added to the polycarbonate solutions or melts promote the removal of the solvents and the other impurities, which are difficult to be volatilized completely, in a surprisingly great extent. As a result, there are obtained polycarbonate materials with improved properties, which do not show the disadvantages of the polycarbonates produced according to the prior art processes as mentioned above. The inert materials must have a boiling point below the decomposition temperature of the polycarbonate and may be in the form of inert gases, materials which liberate inert gases, or other inert substances. By inert materials is meant materials which do not react with the polycarbonate in the solution or melt treated. At least one of the following typical inert substances may be used in the process of this invention:

(a) *Inert gases.*—Nitrogen, carbon monoxide, carbon dioxide, helium, neon, argon, krypton and xenon, at room temperature gaseous hydrocarbons, e.g. methane ethane and propane, and compounds which release inert gases upon heating, e.g. methyl formate, ethyl formate and monomeric or polymeric mixed anhydrides of carbonic acid and aliphatic or aromatic mono- or dicarboxylic acids and mixtures thereof.

(b) *Volatile inert solvents.*—Aliphatic hydrocarbons, such as alkanes, alkenes and mixtures thereof, aromatic hydrocarbons, such as toluene, xylene, benzene, diphenylene, naphthalene, indenes, mesitylene, durene, pentamethylbenzene, hexamethyl benzene, and mixtures thereof.

(c) *Ethers.*—Di-n-butyl ether, dimethyl ether, diethyl ether, methyl ethyl ether, ethyl propyl ether, di-n-propyl ether, di-i-propyl ether, vinyl alkyl ethers, dioxan, anisole, phenetole, veratrole, diphenyl ether, benzyl phenyl ether, dibenzyl ether, and mixtures thereof.

(d) *Hydroxylaryl compounds.*—Phenol, p-tert.-butyl phenol, o- and p-iso-propyl phenol, the cresols, e.g. 2,6-di-tert.-butyl-p-cresol, the xylenols, thymol, durenol, resorcinol, catechol, and mixtures thereof.

(e) *Epoxy compounds.*—Such as glycidol, ethylene oxide, 1,2-propylene oxide, and mixtures thereof.

(f) *Esters.*—Ethyl acetate, butyl acetate, amyl acetate, isoamyl acetate, methyl propionate, ethyl propionate, methyl butyrate, ethyl butyrate, methyl benzoate, phenyl acetate, and mixtures thereof.

(g) *Thermostable halo-hydrocarbons.* — Trichlorofluoromethane, dichlorodifluoromethane, difluorochloroethane, difluorobromoethane, difluorodibromethane, difluorodichloroethane, and mixtures thereof.

It is found that inert materials according to the present invention with a boiling point of up to about 150° C. at atmospheric pressure are preferably added to the crude polycarbonate at a time, when the major portion of solvent in said crude polycarbonate has just been removed. Thus a further decrease of the contaminants content of the final product can be achieved in comparison with the content obtained when adding said inert materials to the initial polycarbonate mix, resulting in improved properties of the polycarbonates in extrusion and injection moulding. The inert materials according to the present invention with a boiling point of above about 150° C. at atmospheric pressure may be added to the crude polycarbonate mix at any time either before or after the crude mix is introduced into the extruder.

It is found, in general, that best results are obtained when the following preferred inert materials are added to the crude polycarbonate solution or polycarbonate melt respectively: nitrogen, carbon dioxide, toluene, xylene, dibutyl ether, anisole, p-tert.-butyl phenol, 2,6-di-tert.-butyl-p-cresol, methyl benzoate and dichlorofluoromethane. All these particular preferred inert materials provide the most desirable effect in general and reduce to the greatest extent the chlorine impurity of the treated crude polycarbonate. Also best results are obtained when these inert materials are added in amounts from about 0.1 to about 10% based on the weight of the crude polycarbonate being treated.

The following examples will more specifically define the particulars of the present invention. It should be noted that these examples illustrate only the use of the preferred inert materials of this invention and are for the purpose of illustration and not limitation. Parts indicated are by weight unless specifically defined to be otherwise.

*Example 1*

(A) A crude polycarbonate material prepared by the phosgenation of bisphenol A (2,2-(4,4′-dihydroxy diphenyl)-propane) as defined in the above noted U.S. Patent 3,028,365 is used in this example. The polycarbonate solution thus prepared contains in addition to solvent (in this instance methylene chloride) and moisture, residual amounts of chlorine-containing impurities. Without the addition of the inert material of this invention, this crude polycarbonate mix is introduced into a two shaft extruder provided with two evaporation or degassing pipes. The cylinder temperature of the extruder is maintained at about 270° C. throughout the extrusion process. The crude polycarbonate mix or solution used is about a 25% solution of polycarbonate in methylene chloride solvent; and has a relative viscosity of about 1.30 (measured in 0.5% methylene chloride solution). This crude polycarbonate is introduced into the extruder at a rate of about 40 kg./hr. The major portion of the methylene chloride solvent leaves the crude polycarbonate mix through the first degassing pipe under atmospheric pressure and the remainder of the solvent leaves via the second pipe under a vacuum of 2 mm. Hg. The final extruded polycarbonate product is analyzed and is found to contain 0.05% chlorine.

The chlorine content of the polycarbonate material is determined by the combustion of a sample of about 3 grams of the polycarbonate in the apparatus described by R. Wickbold (Angew. Chem., 64, 1952, pp. 133–135) and potentiometric titration of the combustion product with N/100 AgNO$_3$-solution in the presence of methanol. The determination accuracy of this method is 0.001 percent by weight chlorine.

(B) The same bisphenol A based polycarbonate product as prepared above (in (A)) is also used in this procedure; however, prior to its introduction into the extruder, about 500 g./hr. of anisole are added to this 25% polycarbonate solution. Other than the addition of anisole, the same process as defined above in (A) of this example is followed using the same conditions of temperature, pressure, etc. The polycarbonate product extruded is analyzed and is found to contain only 0.008% chlorine. The amount of chlorine contamination is substantially reduced by the addition of the anisole to the 25% polycarbonate solution prior to its introduction into the extruder. The amount of chlorine contamination resulting in the final polycarbonate product is reduced from 0.05% to 0.008%. The final product also analyzed by gas chromatrograph indicated only 0.002% of anisole is present.

*Example 2*

(A) The same crude polycarbonate solution used in Example 1 is used in this example. The same procedure as described in Example 1 is followed in this example except that 500 g./hr. of xylene is added to the crude polycarbonate prior to its introduction into the extruder. The final extruded polycarbonate material is analyzed as above in Example 1 and is found to contain a total amount of 0.02% chlorine and 0.001% xylene.

(B) The procedure described above under (A) is repeated except that 500 g./hr. of xylene is added to the solvent-lean polycarbonate melt which is obtained in the extruder after the main amount of the solvent vapour has left the polycarbonate mix by the first evaporation pipe of the extruder under atmospheric pressure, said xylene being added immediately before said melt enters the second evaporation zone of the extruder, said evaporation zone being held at a pressure of 2 mm. Hg. The final extruded polycarbonate material is analyzed as described in Example 1 and is found to contain a total amount of 0.001 percent chloride.

*Example 3*

The procedure of Example 2 is followed, however, in addition to the xylene about 20 g./hr. of 2,6-di-tert.-butyl-p-cresol is simultaneously added to the crude polycarbonate. The extruded polycarbonate product obtained is analyzed as in the above examples and found to contain a total of 0.006% chlorine.

*Example 4*

The procedure of Example 1(A) is followed, however, about 100 g./hr. of poly-bisphenol A-carboxylic acid ester isophthalic anhydride is added to the polycarbonate solution. This anhydride has a relative viscosity of about 1.24 (measured in 0.5% methylene chloride solution) and contains about 20% bound isophthalic acid. After extrusion of this polycarbonate, it is analyzed and found to have a total chlorine content of about 0.012%.

*Example 5*

The same process is followed as in the process described in Example 1, but instead of anisole about 500 g. methyl benzoate per hour are added to the polycarbonate solution before its entry into the extruder. The extruded polycarbonate product contains a total amount of chlorine of about 0.008% by weight.

*Example 6*

In a two-shaft extruder provided with two evaporation pipes there is continuously evaporated at a cylinder temperature of about 270° C. and at a rate of about 40 kg./hr. a 25% by weight solution of a bisphenol A polycarbonate with a relative viscosity of 1.30 (measured in 0.5% methylene chloride solution at 20° C.) in methylene chloride. The main amount of the solvent vapor leaves by the first evaporation pipe under atmospheric pressure. About 100 grams nitrogen per hour are then pressed into the resulting solvent-lean polycarbonate melt immediately before said melt enters the second evaporation zone, which is held under a vacuum of 2 mm. Hg. The total chlorine content of the extruded polycarbonate is as low as 0.003% by weight.

*Example 7*

The same process is followed as is the process described in Example 6, but instead of nitrogen, there is added the materials listed in the first column of the following table. In the second column of the table there is given the rate at which said material is added to the polycarbonate melt, whereas the third column shows the total chloride content in percent by weight of the extruded polycarbonate.

| Inert Materials | Rate | Chlorine (percent by weight) |
|---|---|---|
| Carbon dioxide | 160 | 0.005 |
| Dichloro-difluoro methane | 400 | 0.008 |
| Di-n-butyl ether | 500 | 0.010 |

The polycarbonates used in the present invention are generally referred to as high molecular weight polycarbonates having a molecular weight of at least 10,000 and preferably more than 25,000. Besides the addition of the above described inert materials it may be desirable in some situations to also add stabilizers for chlorinated-hydrocarbons, in order to avoid the decomposition thereof which can occur in the course of the heating of the polycarbonate mixtures. Also the above examples describe the polycarbonate solution as a 25% solution; it should be understood that any crude dilute polycarbonate solution ranging from about 2 to about 30 to 40% solution may be used.

Although the invention has been described in considerable detail for the purpose of illustration, it is to be understood that variations may be made therein by those skilled in the art without departing from the spirit of the invention and scope of the claims.

What is claimed is:

1. A process for reducing the residual content of volatilizable impurities of a crude polycarbonate mix which comprises heating a polycarbonate solution of from about 2 to about 40 percent by weight of polycarbonate to at least the boiling point of the solvent in said polycarbonate solution, thereby volatilizing a portion of said solvent, adding to the remaining polycarbonate mix at least one material substantially chemically inert to the polycarbonate mix, said inert material having a boiling point different from the solvent in said mix and below the decomposition temperature of the polycarbonate in said mix, heating the resulting mixture to at least the melting point of the polycarbonate in said crude mix and thereafter recovering the resulting substantially pure polycarbonate.

2. The process of claim 1, wherein said inert material is a liquid having a boiling point above the boiling point of the solvent remaining in said mix.

3. The process of claim 1, wherein said inert material is an inert gas.

4. A process for reducing the residual chlorine content of a crude polycarbonate mix in an extrusion system which comprises introducing a polycarbonate solution of from about 2 to about 40 percent by weight of polycarbonate into an extruder, heating said solution to at least the boiling point of the solvent in said polycarbonate solution, thereby volatilizing a portion of said solvent, adding to the remaining polycarbonate mix at least one material substantially chemically inert to the polycarbonate in said mix, said inert material having a boiling point different from the solvent in said mix and below the decomposition temperature of the polycarbonate in said mix, heating the resulting mixture to at least the melting point of the polycarbonate in said crude mix and thereafter extruding the resulting substantially chlorine contaminate-free polycarbonate.

5. The process of claim 1 wherein said crude polycarbonate mix is prepared by a process which comprises reacting 2,2-(4,4'-dihydroxy diphenyl)-propane with at least one composition selected from the group consisting of phosgene, bis-chloro carbonic acid esters, and diaryl carbonates.

6. The process of claim 1 wherein said crude polycarbonate mix at the time of admixture with said inert material comprises in a major portion a polycarbonate solvent.

7. The process of claim 2 wherein said inert material is anisole.

8. The process of claim 2 wherein said inert material is 2,6-di-tert.-butyl-p-cresol.

9. The process of claim 3 wherein said inert material is nitrogen.

10. The process of claim 3 wherein said inert material is carbon dioxide.

11. The process of claim 2 wherein said inert material is dibutyl ether.

12. The process of claim 2 wherein said inert material is methyl benzoate.

13. The process of claim 2 wherein said inert material is dichloro-difluoro methane.

14. The process of claim 2 wherein said inert material is xylene.

15. The process of claim 2 wherein said inert material is toluene.

References Cited by the Examiner

UNITED STATES PATENTS

| 2,989,503 | 6/1961 | Jibben | 260—47 |
| 3,022,271 | 2/1962 | Darr et al. | 260—47 |
| 3,112,292 | 11/1963 | Bottenbruch et al. | 260—47 |

FOREIGN PATENTS

| 1,240,227 | 7/1960 | France. |
| 897,201 | 5/1962 | Great Britain. |
| 614,030 | 12/1960 | Italy. |

SAMUEL H. BLECH, *Primary Examiner.*